United States Patent
Loewen et al.

(10) Patent No.: US 9,945,506 B2
(45) Date of Patent: Apr. 17, 2018

(54) SEISMIC SLIP JOINT, SEISMIC-MITIGATING PIPING SYSTEM, AND METHOD OF MITIGATING SEISMIC EFFECTS ON A PIPING SYSTEM

(71) Applicants: Eric P. Loewen, Wilmington, NC (US); Scott Pfeffer, Wilmington, NC (US); Maria E. Pfeffer, Wilmington, NC (US)

(72) Inventors: Eric P. Loewen, Wilmington, NC (US); Scott Pfeffer, Wilmington, NC (US); Maria E. Pfeffer, Wilmington, NC (US)

(73) Assignee: GE—Hitachi Nuclear Energy Americas LLC, Wilmington, NC (US)

( * ) Notice: Subject to any disclaimer, the term of this patent is extended or adjusted under 35 U.S.C. 154(b) by 1051 days.

(21) Appl. No.: 13/966,519

(22) Filed: Aug. 14, 2013

(65) Prior Publication Data

US 2015/0048612 A1 Feb. 19, 2015

(51) Int. Cl.
*F16L 57/00* (2006.01)
*F16L 27/12* (2006.01)

(52) U.S. Cl.
CPC .............. *F16L 57/00* (2013.01); *F16L 27/12* (2013.01)

(58) Field of Classification Search
CPC ......... F16L 57/00; F16L 27/12; F16L 37/002; F16L 25/10; F16L 55/02; F16L 55/1015; F16L 55/1022; F16L 2201/20

(Continued)

(56) References Cited

U.S. PATENT DOCUMENTS 2,816,780 A * 12/1957 Ross ...................... F16L 17/10
277/605
4,098,284 A 7/1978 Yamada
(Continued)

FOREIGN PATENT DOCUMENTS

EP 0086130 A1 8/1983
EP 0305171 A1 3/1989
(Continued)

OTHER PUBLICATIONS

Unofficial English Translation of Spanish Search Report and Opinion issued in connection with corresponding ES Application No. 201431187 dated Apr. 16, 2015.
(Continued)

*Primary Examiner* — James M Hewitt, II
(74) *Attorney, Agent, or Firm* — Harness, Dickey & Pierce, P.L.C.

(57) ABSTRACT

A seismic slip joint may include a fixed sealing surface, a moveable sealing surface, and a solenoid device. The moveable sealing surface is configured to engage the fixed sealing surface to form a sealing interface during a deactivated state. The sealing interface may be a juncture that precludes passage of a fluid therethrough. The solenoid device is configured to switch between the deactivated state and an activated state. The solenoid device may include a piston and a spring structure. The piston is connected to the moveable sealing surface. The spring structure exerts a force on the piston so as to press the moveable sealing surface against the fixed sealing surface to form the sealing interface during the deactivated state. The piston may be configured to compress the spring structure and retract during the activated state so as to separate the moveable sealing surface from the fixed sealing surface.

14 Claims, 6 Drawing Sheets

(58) Field of Classification Search
USPC .... 285/1, 304, 33, 920; 174/68.1, 68.3, 260, 174/73.1, 74, 88 R, 70 C, 135; 251/129.15–129.22, 142, 145–151, 340
See application file for complete search history.

(56) References Cited

U.S. PATENT DOCUMENTS

| | | | |
|---|---|---|---|
| 4,138,148 A * | 2/1979 | Zaremba | E21B 33/038 166/340 |
| 4,431,215 A * | 2/1984 | Moyer | E21B 33/038 285/18 |
| 4,776,617 A | 10/1988 | Sato | |
| 5,165,439 A * | 11/1992 | Krynicki | F16K 17/40 137/1 |
| 5,560,162 A | 10/1996 | Kemeny | |
| 5,588,511 A | 12/1996 | Kallenbach | |
| 5,897,146 A | 4/1999 | Saito et al. | |
| 6,161,878 A | 12/2000 | Atsumi et al. | |
| 6,568,424 B1 * | 5/2003 | Galad | F16K 35/08 137/523 |
| 6,659,511 B2 | 12/2003 | Yoneyama et al. | |
| 7,243,954 B2 | 7/2007 | Toshima et al. | |
| 7,708,064 B2 | 5/2010 | Sehsah | |
| 7,971,838 B2 | 7/2011 | Osborn et al. | |
| 2007/0267139 A1 | 11/2007 | Fisher | |
| 2010/0025045 A1 * | 2/2010 | Lake | E21B 34/066 166/373 |
| 2011/0241342 A1 | 10/2011 | Skellern et al. | |
| 2012/0091707 A1 | 4/2012 | Lee et al. | |

FOREIGN PATENT DOCUMENTS

| | | |
|---|---|---|
| EP | 0402700 A1 | 12/1990 |
| EP | 2320044 A1 | 5/2011 |
| FR | 2603973 A1 | 3/1988 |
| GB | 2406887 A | 4/2005 |
| JP | 01-012993 | 3/1989 |
| JP | 2000266260 A | 9/2000 |
| JP | 2005-061082 A | 3/2005 |
| JP | 2011-144855 A | 7/2011 |
| JP | 2012-167702 A | 9/2012 |

OTHER PUBLICATIONS

Mexican Office Action dated May 15, 2017 for corresponding MX Application MX/a/2014/009793.
Office Action and Search issued in connection with corresponding TW Application No. 103126422 dated Jun. 30, 2017.
Office Action for corresponding Japanese Application No. 2014-160995 dated May 16, 2016 and English translation thereof.
Notice of Allowance for corresponding Japanese Application No. 2014-160995 dated Sep. 27, 2016 and English translation thereof.

* cited by examiner

SEISMIC SLIP JOINT, SEISMIC-MITIGATING PIPING SYSTEM, AND METHOD OF MITIGATING SEISMIC EFFECTS ON A PIPING SYSTEM

BACKGROUND

Field

The present disclosure relates to devices, assemblies, and methods for mitigating the effects of seismic events on piping systems.

Description of Related Art

A conventional piping system may include one or more pipes wherein one end of a pipe has a fixed point of reference and a certain resonance frequency, while the other end of the pipe has another fixed point of reference and a different resonance frequency. During a seismic event (e.g., earthquake), the different resonance frequencies may cause a relatively large amount of strain on the piping system. Consequently, the piping system may experience a loss of integrity and/or loss of operation after the seismic event. Furthermore, for nuclear power plants, such damage may result in the release of radioactive materials.

BRIEF DESCRIPTION OF EXAMPLE EMBODIMENTS

A seismic slip joint may include a fixed sealing surface, a moveable sealing surface, and a solenoid device. The moveable sealing surface may be configured to engage the fixed sealing surface to form a sealing interface during a deactivated state, the sealing interface being a juncture that precludes passage of a fluid therethrough. The solenoid device may be configured to switch between the deactivated state and an activated state, the solenoid device including a piston and a spring structure, the piston connected to the moveable sealing surface, the spring structure exerting a force on the piston so as to press the moveable sealing surface against the fixed sealing surface to form the sealing interface during the deactivated state, the piston configured to compress the spring structure and retract during the activated state so as to separate the moveable sealing surface from the fixed sealing surface.

A seismic-mitigating piping system may include a first pipe, a second pipe, and a seismic slip joint. The first pipe has a first diameter. The second pipe has a second diameter, the second diameter being greater than the first diameter, the second pipe encompassing a terminal portion of the first pipe. The seismic slip joint may connect the terminal portion of the first pipe and the second pipe, the seismic slip joint including a fixed sealing surface, a moveable sealing surface, and a solenoid device, the fixed sealing surface being disposed on the first pipe, the moveable sealing surface being connected to the solenoid device, the moveable sealing surface configured to engage the fixed sealing surface so as to secure the terminal portion of the first pipe during a deactivated state, the solenoid device configured to switch between the deactivated state and an activated state so as to release the terminal portion of the first pipe in response to a seismic activity signal.

A method of mitigating seismic effects on a piping system may include a connecting step, a detecting step, an activating step, and a deactivating step. The connecting step may include connecting a first pipe and a second pipe with a seismic slip joint, the seismic slip joint including a solenoid device, the solenoid device including a spring structure that secures the first pipe to the second pipe. The detecting step may include detecting a seismic activity signal from a seismic activity sensor, the seismic activity signal being in response to a seismic event that exceeds a predetermined magnitude. The activating step may include activating the solenoid device in response to the seismic activity signal to release the first pipe from the second pipe so as to allow the first pipe and the second pipe to move relative to each other during the seismic event. The deactivating step may include deactivating the solenoid device after cessation of the seismic event to resecure the first pipe to the second pipe.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 1:
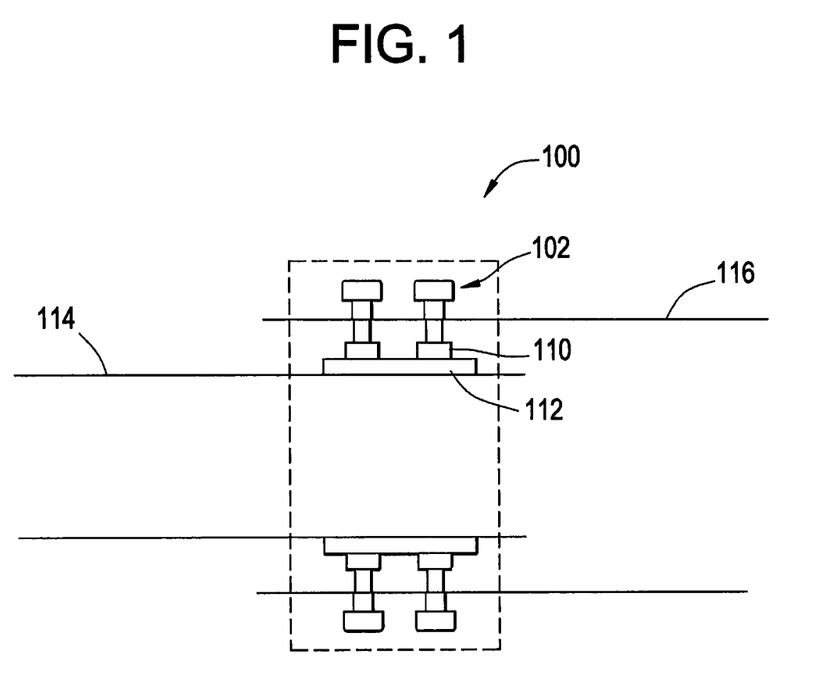
FIG. 1 is a schematic view of a seismic slip joint according to an example embodiment.

FIG. 1 is a schematic view of a seismic slip joint according to an example embodiment. Referring to FIG. 1, the seismic slip joint 100 connects the first pipe 114 to the second pipe 116. The seismic slip joint 100 includes a fixed sealing surface 112, a moveable sealing surface 110, and a solenoid device 102. In a non-limiting embodiment, the solenoid device 102 may be an electromechanical solenoid that includes an inductive coil wound around a movable metal armature (e.g., piston, slug). The inductive coil is shaped such that the armature can be moved in and out of the center. When a current is supplied to the inductive coil, an electromagnetic field is generated. In response to the electromagnetic field, the armature will move in a direction that increases the coil's inductance. As a result, the armature can be used to provide a mechanical force to effectuate a desired action.

The fixed sealing surface 112 and the moveable sealing surface 110 are between the first pipe 114 and the second pipe 116. In particular, the fixed sealing surface 112 is mounted on the outer surface of the first pipe 114. The solenoid device 102 extends through the second pipe 116 and is connected to the moveable sealing surface 110. The moveable sealing surface 110 is between the fixed sealing surface 112 and the solenoid device 102. The moveable sealing surface 110 is configured to engage the fixed sealing surface 112 to form a sealing interface during a deactivated state. The sealing interface is a juncture that precludes passage of a fluid therethrough. As a result, the fluid flowing through the first pipe 114 and the second pipe 116 is confined therein during the deactivated state. The solenoid device 102 is configured to switch between the deactivated state and an activated state.

Figure 2:
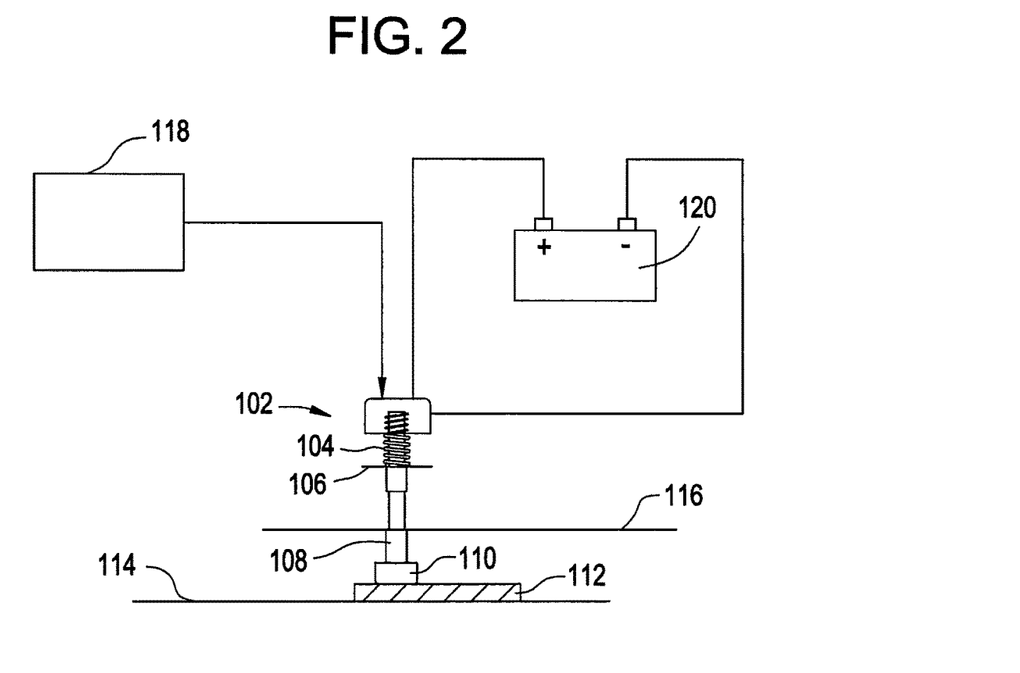
FIG. 2 is a more detailed view of a seismic slip joint according to an example embodiment.

FIG. 2 is a more detailed view of a seismic slip joint according to an example embodiment. Referring to FIG. 2, the solenoid device 102 includes a piston 108 and a spring structure 104. The spring structure 104 is wrapped around the piston 108. The piston 108 is connected to the moveable sealing surface 110. The piston 108 includes a first end, an opposing second end, and a stopper portion 106 between the first end and the opposing second end. The stopper portion 106 of the piston 108 is between the moveable sealing surface 110 and the spring structure 104. The spring structure 104 exerts a force on the piston 108 so as to press the moveable sealing surface 10 against the fixed sealing surface 112 to form the sealing interface during the deactivated state. In particular, the spring structure 104 exerts the force on the stopper portion 106 of the piston 108. The piston 108 is configured to compress the spring structure 104 and retract during the activated state so as to separate the moveable sealing surface 110 from the fixed sealing surface 112. However, it should be understood that example embodiments are not limited to a spring structure. For instance, a variety of other resilient structures and arrangements may be used in the seismic slip joint 100 so as to involve an active compression during the activated state (to release/unseal the first pipe 114 and the second pipe 116) and a passive decompression during the deactivated state (to resecure/reseal the first pipe 114 and the second pipe 116).

A seismic activity sensor 118 is configured to detect a seismic event (e.g., earthquake) and to send the seismic activity signal to the solenoid device 102 when the seismic event exceeds a predetermined magnitude. A battery 120 is configured to supply a current to the solenoid device 102 during the activated state. The moveable sealing surface 110 is separated from the fixed sealing surface 112 during the activated state. As a result, the first pipe 114 will be able to move relative to the second pipe 116, thereby mitigating or preventing damage to the piping system from the seismic event. During the activated state, the fluid within the first pipe 114 and the second pipe 116 may spill outwards, but the leakage is merely temporary and will cease during the deactivated state when the seal is reestablished. The area of the fixed sealing surface 112 that is designed to interface with the moveable sealing surface 110 may be larger (e.g., at least 2-10 times larger) than that of the moveable sealing surface 110 to accommodate for potential shifts in the first pipe 114 and/or second pipe 116 during the seismic event.

Figure 3:
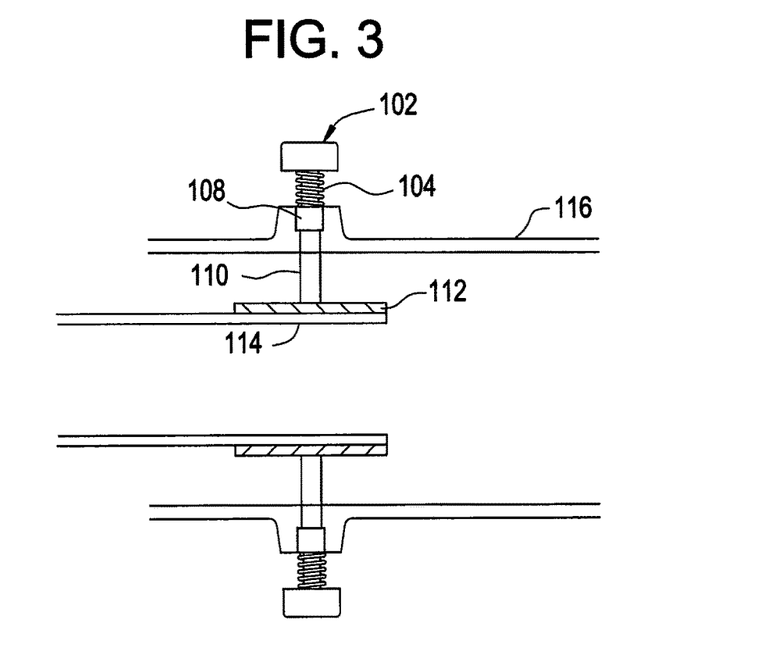
FIG. 3 is another more detailed view of a seismic slip joint according to an example embodiment.

FIG. 3 is another more detailed view of a seismic slip joint according to an example embodiment. Referring to FIG. 3, the moveable sealing surface 110 may extend vertically from the piston 108 to the fixed sealing surface 112. The moveable sealing surface 110 may also extend through the entire annular space between the first pipe 114 and the second pipe 116.

Figure 4:
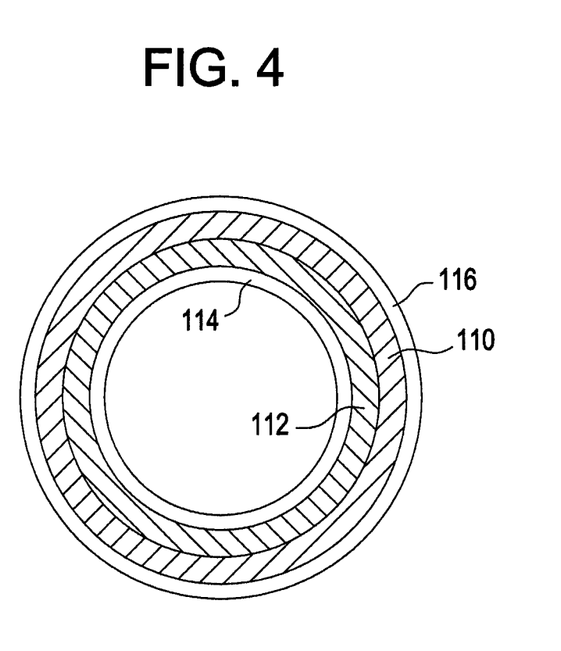
FIG. 4 is a front view of a seismic slip joint according to an example embodiment.

FIG. 4 is a front view of a seismic slip joint according to an example embodiment. Referring to FIG. 4, the moveable sealing surface 110 is seated against the fixed sealing surface 112 to form a sealing interface during the deactivated state.

Figure 5:
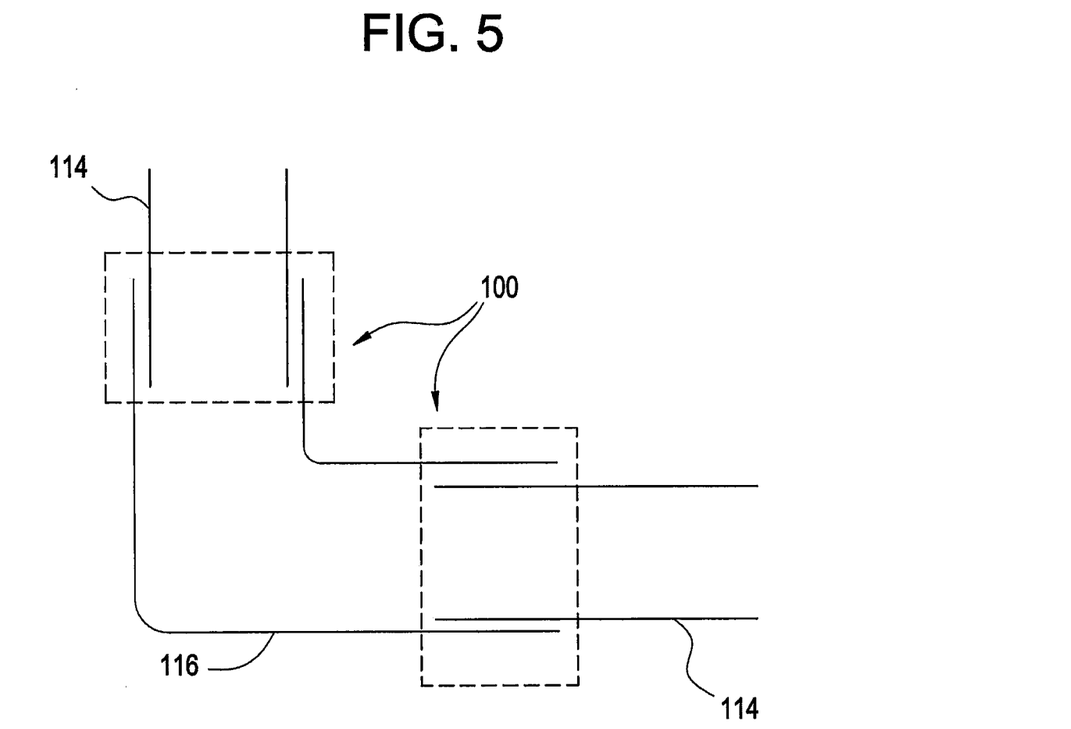
FIG. 5 is a schematic view of a seismic-mitigating piping system according to an example embodiment.

FIG. 5 is schematic view of a seismic-mitigating piping system according to an example embodiment. Referring to FIG. 5, the seismic slip joint 100 may be used to connect vertical or horizontal sections of the first pipe 114 to the second pipe 116. Although the first pipe 114 and the second pipe 116 are illustrated as being in a 90 degree arrangement, it should be understood that example embodiments are not limited thereto. For instance, the first pipe 114 and the second pipe 116 may be connected by a seismic slip joint 100 while forming a linear arrangement, an acute angle arrangement, or an obtuse angle arrangement. The first pipe 114 has a first diameter, and the second pipe 116 having a second diameter, wherein the second diameter is greater than the first diameter. As a result, the second pipe 116 encompasses a terminal portion of the first pipe 114. The first pipe 114 may be coaxially arranged within the second pipe 116, with the outer surface of the first pipe 114 and the inner surface of the second pipe 116 defining an annular space therebetween. A seismic slip joint 100 connects the terminal portion of the first pipe 114 and the second pipe 116.

As discussed in connection with FIGS. 1-2, the seismic slip joint 100 includes a fixed sealing surface 112, a moveable sealing surface 110, and a solenoid device 102. The fixed sealing surface 112 is disposed on the first pipe 114. The moveable sealing surface 110 is connected to the solenoid device 102. The moveable sealing surface 110 is configured to engage the fixed sealing surface 112 so as to secure the terminal portion of the first pipe 114 during a deactivated state. The solenoid device 102 is configured to switch between the deactivated state and an activated state so as to release the terminal portion of the first pipe 114 in response to a seismic activity signal. Although the interfacing portions of the moveable sealing surface 110 and the fixed sealing surface 112 are illustrated in FIGS. 1-2 as being planar, it should be understood that example embodiments are not limited thereto. The interfacing portions of the moveable sealing surface 110 and the fixed sealing surface 112 may be in any form that facilitates the formation of a proper sealing interface.

Figure 6:
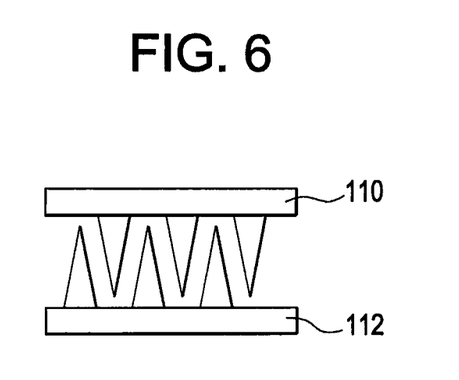
FIG. 6 is a schematic view of a fixed sealing surface and moveable sealing surface of a seismic slip joint according to an example embodiment.

FIG. 6 is a schematic view of a fixed sealing surface and moveable sealing surface of a seismic slip joint according to an example embodiment. Referring to FIG. 6, both the moveable sealing surface 110 and the fixed sealing surface 112 have alternately-arranged teeth to facilitate the formation of a sealing interface. Alternatively, the teeth may be rounded (e.g., hemispherical), squared, or trapezoidal in shape. Additionally, the teeth may be provided on only one of the moveable sealing surface 110 and the fixed sealing surface 112. For instance, the teeth may be provided on only the moveable sealing surface 110, while the fixed sealing surface 112 has a planar form.

Figure 7:
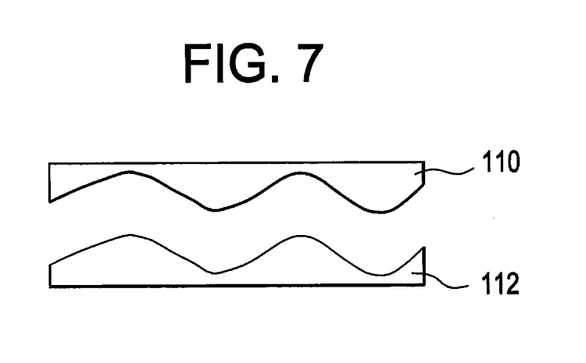
FIG. 7 is a schematic view of another fixed sealing surface and moveable sealing surface of a seismic slip joint according to an example embodiment.

FIG. 7 is a schematic view of another fixed sealing surface and moveable sealing surface of a seismic slip joint according to an example embodiment. Referring to FIG. 7, the interfacing portions of both the moveable sealing surface 110 and the fixed sealing surface 112 have an undulating form, wherein the ridge of one is aligned with the furrow of the other. Alternatively, only one of the moveable sealing surface 110 and the fixed sealing surface 112 may be provided with an undulating form. Additionally, the interfacing portion of one or both the moveable sealing surface 110 and the fixed sealing surface 112 may be angular in form (with peaks and valleys) instead of being wavelike.

Figure 8:
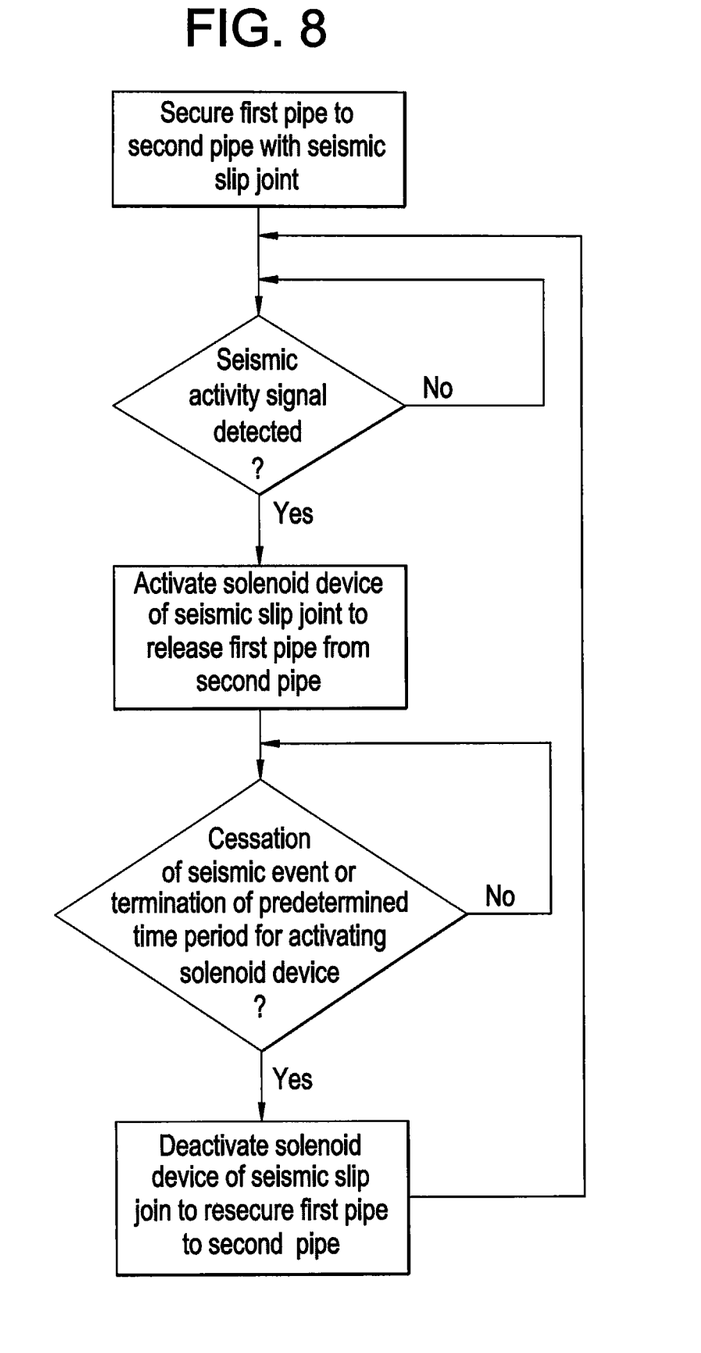
FIG. 8 is a flow diagram of a method of mitigating seismic events on a piping system according to an example embodiment.

FIG. 8 is a flow diagram of a method of mitigating seismic events on a piping system according to an example embodiment. Referring to FIG. 8, a method of mitigating seismic effects on a piping system includes connecting a first pipe 114 and a second pipe 116 with a seismic slip joint 100. The connecting includes inserting a smaller terminal portion of the first pipe 114 into a larger terminal portion of the second pipe 116. As a result, the smaller terminal portion of the first pipe 114 and the larger terminal portion of the second pipe 116 may define an annular space therebetween. The seismic slip joint 100 includes a solenoid device 102. The solenoid device 102 includes a spring structure 104 that secures the first pipe 114 to the second pipe 116. In particular, the resilient force provided by the spring structure 104 causes the seismic slip joint 100 to default to a deactivated state.

The method additionally includes detecting a seismic activity signal from a seismic activity sensor 118. The seismic activity signal is generated by the seismic activity sensor 118 in response to a seismic event that exceeds a predetermined magnitude. A nuclear power plant may already have an automatic seismic scram system which shuts down operations when a seismic event reaches a certain magnitude. The set point for the seismic activity sensor 118 may coincide with that of the automatic seismic scram system of the nuclear power plant, although example embodiments are not limited thereto. For instance, the seismic activity signal may be generated by the seismic activity sensor 118 when oscillations produced by the seismic event exceed 50% of Safe Shutdown Earthquake (SSE). In another non-limiting embodiment, the seismic activity signal may be generated by the seismic activity sensor 118 when oscillations produced by the seismic event reach or exceed 60% of Safe Shutdown Earthquake (SSE). Those ordinarily skilled in the art understand that Safe Shutdown Earthquake (SSE) is the maximum earthquake potential for which certain structures, systems, and components (important to safety) are designed to sustain and remain functional.

The method also includes activating the solenoid device 102 in response to the seismic activity signal to release the first pipe 114 from the second pipe 116 so as to allow the first pipe 114 and the second pipe 116 to move relative to each other during the seismic event. The activating includes supplying a current to the solenoid device 102 to facilitate an active compression of the spring structure 104. In particular, the supply of current to the solenoid device 102 generates a magnetic field that causes to a mechanical movement (e.g., retraction of piston 108) that compresses the spring structure 104, thereby separating the moveable sealing surface 110 from the fixed sealing surface 112. The activation of the solenoid device 102 is temporary and relieves the strain on the piping system during the seismic event.

The method further includes deactivating the solenoid device 102 after cessation of the seismic event to resecure the first pipe 114 to the second pipe 116. The deactivating includes ceasing a supply of current to the solenoid device 102 to allow a passive decompression of the string structure 104. In particular, the magnetic field (generated by supply of current) will cease in the absence of a current, thereby allowing the spring structure 104 to return to its default position by virtue of its resilient nature, wherein the moveable sealing surface 110 will become seated against the fixed sealing surface 112 to form the sealing interface. Thus, electrical power is not needed to reestablish the sealing interface. Due to the repositioning of the first pipe 114 and/or the second pipe 116 that may have occurred during the seismic event, the moveable sealing surface 110 may become seated against a different portion of the fixed sealing surface 112 (compared to the initial seated position of the moveable sealing surface 110 relative to the fixed sealing surface 112 prior to activating the solenoid device 102).

The deactivating the solenoid device 102 may occur automatically after a predetermined or desired amount of time following the seismic activity signal. For instance, an internal timer may be used to trigger the deactivation of the solenoid device 102. A controller may also be configured such that a new time period is set if a second seismic activity signal is detected prior to expiration of the initial time period associated with the first seismic activity signal. Alternatively, deactivating the solenoid device 102 may occur manually following the cessation of the seismic event.

By utilizing the seismic slip joints, systems, and associated methods discussed herein, the integrity and functionality of piping systems may be preserved (or at least the damage may be mitigated) during a seismic event. For instance, in addition to mitigating or preventing breakage of the piping, permanent deformation of the piping system may also be mitigated or prevented. Accordingly, a faster and better recovery may be possible for an affected plant (e.g., nuclear power plant) after the seismic event.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A seismic slip joint comprising:
    a fixed sealing surface;
    a moveable sealing surface configured to engage the fixed sealing surface to form a sealing interface during a deactivated state, the sealing interface being a juncture that precludes passage of a fluid therethrough;
    a solenoid device configured to switch between the deactivated state and an activated state in response to a seismic activity signal, the solenoid device including a piston and a spring structure, the piston connected to the moveable sealing surface, the spring structure exerting a force on the piston so as to press the moveable sealing surface against the fixed sealing surface to form the sealing interface during the deactivated state, the piston configured to compress the spring structure and retract during the activated state so as to separate the moveable sealing surface from the fixed sealing surface; and
    a seismic activity sensor configured to generate the seismic activity signal in response to a seismic event and to send the seismic activity signal to the solenoid device so as to release the moveable sealing surface from the fixed sealing surface during the seismic event and to resecure the moveable sealing surface to the fixed sealing surface upon a return to the deactivated state after the seismic event.

2. The seismic slip joint of claim 1, wherein the moveable sealing surface is between the fixed sealing surface and the solenoid device.

3. The seismic slip joint of claim 1, wherein the spring structure is wrapped around the piston.

4. The seismic slip joint of claim 1, wherein the piston includes a first end, an opposing second end, and a stopper portion between the first end and the opposing second end.

5. The seismic slip joint of claim 4, wherein the stopper portion of the piston is between the moveable sealing surface and the spring structure.

6. The seismic slip joint of claim 1, wherein the spring structure exerts the force on the stopper portion of the piston.

7. The seismic slip joint of claim 1, wherein the fixed sealing surface and the moveable sealing surface are configured to be able to move relative to each other during the activated state such that the moveable sealing surface is able to be seated against a different portion of the fixed sealing surface upon a return to the deactivated state.

8. The seismic slip joint of claim 1, wherein the fixed sealing surface and the moveable sealing surface are configured to at least be able to shift toward and past each other during the activated state.

9. A seismic-mitigating piping system comprising:
    a first pipe having a first diameter;
    a second pipe having a second diameter, the second diameter being greater than the first diameter, the second pipe encompassing a terminal portion of the first pipe; and
    a seismic slip joint connecting the terminal portion of the first pipe and the second pipe, the seismic slip joint including a fixed sealing surface, a moveable sealing surface, a solenoid device, and a seismic activity sensor, the fixed sealing surface being disposed on the first pipe, the moveable sealing surface being connected to the solenoid device, the moveable sealing surface configured to engage the fixed sealing surface so as to secure the terminal portion of the first pipe during a deactivated state, the solenoid device configured to switch between the deactivated state and an activated state so as to release the terminal portion of the first pipe in response to a seismic activity signal, the seismic activity sensor configured to generate the seismic activity signal in response to a seismic event and to send the seismic activity signal to the solenoid device so as to release the moveable sealing surface from the fixed sealing surface during the seismic event and to resecure the moveable sealing surface to the fixed sealing surface upon a return to the deactivated state after the seismic event.

10. The seismic-mitigating piping system of claim 9, wherein the fixed sealing surface and the moveable sealing surface are between the first pipe and the second pipe.

11. The seismic-mitigating piping system of claim 9, wherein the moveable sealing surface and the fixed sealing surface form a sealing interface during the deactivated state, the sealing interface being a juncture that precludes passage of a fluid therethrough.

12. The seismic-mitigating piping system of claim 9, wherein the moveable sealing surface is separated from the fixed sealing surface during the activated state.

13. The seismic-mitigating piping system of claim 9, further comprising:
    a battery configured to supply a current to the solenoid device during the activated state.

14. The seismic-mitigating piping system of claim 9, wherein the first pipe is configured to at least be able to shift further into the second pipe during the activated state.

\* \* \* \* \*